(12) United States Patent
Degner et al.

(10) Patent No.: US 8,888,450 B2
(45) Date of Patent: Nov. 18, 2014

(54) SCULPTED FAN HOUSING

(76) Inventors: Brett W. Degner, Menlo Park, CA (US); Jay S. Nigen, Mountain View, CA (US); Jesse T. Dybenko, Cupertino, CA (US)

(*) Notice: Subject to any disclaimer, the term of this patent is extended or adjusted under 35 U.S.C. 154(b) by 154 days.

(21) Appl. No.: 13/243,779

(22) Filed: Sep. 23, 2011

(65) Prior Publication Data

US 2013/0075065 A1    Mar. 28, 2013

(51) Int. Cl.
*F04D 29/42* (2006.01)
*F04D 29/44* (2006.01)
*F04D 29/58* (2006.01)
*F04D 25/06* (2006.01)

(52) U.S. Cl.
CPC .......... *F04D 25/0613* (2013.01); *F04D 29/445* (2013.01); *F04D 29/582* (2013.01); *F04D 29/4266* (2013.01)
USPC .......................................... 415/206; 415/224

(58) Field of Classification Search
CPC .............................. F04D 29/602; F04D 29/601
USPC ............ 416/178, 187; 415/182.1, 206, 208.1, 415/208.5, 224, 204, 203
See application file for complete search history.

(56) References Cited

U.S. PATENT DOCUMENTS

| 5,743,710 | A | 4/1998 | Yapp | |
|---|---|---|---|---|
| 6,132,170 | A * | 10/2000 | Horng | 415/178 |
| 6,787,949 | B2 | 9/2004 | Bostwick et al. | |
| 7,450,381 | B2 | 11/2008 | Gilliand et al. | |
| 7,549,842 | B2 * | 6/2009 | Hanson et al. | 415/204 |
| 7,676,302 | B2 | 3/2010 | Frankel et al. | |
| 7,848,105 | B2 | 12/2010 | Holmes et al. | |
| 2002/0176775 | A1 * | 11/2002 | Lee et al. | 415/206 |
| 2005/0226721 | A1 * | 10/2005 | Higashida | 415/206 |
| 2007/0197156 | A1 | 8/2007 | Hanson et al. | |
| 2008/0107523 | A1 | 5/2008 | Chen et al. | |
| 2009/0257869 | A1 | 10/2009 | Li | |
| 2011/0058938 | A1 * | 3/2011 | Chen | 415/206 |
| 2011/0189004 | A1 | 8/2011 | Dybenko et al. | |

FOREIGN PATENT DOCUMENTS

JP    2004347311 A  * 12/2004

OTHER PUBLICATIONS

JP 2004-347311 A Machine Translation. Accessed JPO Website Jul. 2, 2013.*
PCT/US2012/054677, International Search Report and Written Opinion (Dec. 20, 2012).
Buckley, Sean, Noctua's Noise-Canceling PC Fan Gets Tested, Drops Twenty Decibels, http://www.engadget.com/2012/06/11/noctuas-noise-canceling-pc-fan-gets-tested-drops-twenty-decib/?utm_medium=referral&utm_source=pulsenews, downloaded Jun. 12, 2012, 7 pages.
Australian Patent Application No. 2014100017—Patent Examination Report No. 1 dated Feb. 17, 2014.
Korean Patent Application No. 10-2014-7004708—Office Action dated Mar. 28, 2014.

* cited by examiner

*Primary Examiner* — Richard Edgar
(74) *Attorney, Agent, or Firm* — Womble Carlyle Sandridge & Rice LLP (57) ABSTRACT

The described embodiments relate generally to optimizing airflow in a computer system. By modifying the external surface of centrifugal cooling fan enclosures the pressure drop associated with airflow moving around the enclosures can be reduced. This is generally accomplished by rounding off hard edges from the outside of the cooling fan enclosure as well as forming cover surfaces rather than simply using flat cover surfaces. In some cases this can also involve modifying the shape of the fan inlet, or even contouring the shape of the cooling fan blades to allow air to flow more easily through the computer enclosure.

20 Claims, 9 Drawing Sheets

Conventional Art

*FIG. 1A*

Conventional Art

*FIG. 1B*

Conventional Art

SCULPTED FAN HOUSING

BACKGROUND

1. Field of the Described Embodiments

The described embodiments relate generally to optimizing airflow through a computer enclosure. In particular, approaches to reducing obstacles that lead to inefficient air flow and resultant reduction in cooling efficacy are described.

2. Related Art

The performance of computational components and storage devices in computing systems, such as personal computers and rack mounted servers, require effective cooling mechanisms to ensure that the components and devices used inside operate in a preferred temperature range. The operational stability of central processing units (CPUs), video processing units, memory and storage devices, for example, can be adversely affected by heat accumulation within enclosed spaces in which they are housed, such as encountered in relatively thin notebook computers. With each newly introduced computing system, the performance of components used internally are being increased, while simultaneously, the dimensions of the external enclosure that houses the computing system are being decreased, thereby challenging the computer system designers to devise more efficient cooling methods. The narrow height dimensions of portable computer housings can require more efficient cooling methods than can be provided by thermal conduction alone or even when combined with conventional air circulation fan designs.

Air circulation fans within computing systems can include axial fans that move air parallel to the rotational axis of the fan's impeller and centrifugal fans that blow air through an outlet perpendicular to an air inlet opening. Several geometric properties of a centrifugal fan's shape can affect its air flow performance, including the size, shape and orientation of the air inlet opening through which air is drawn when rotating the fan's impeller. In a typical prior art centrifugal fan, a circular inlet opening in the fan's housing is positioned concentric with the rotational axis of an impeller situated inside the fan housing. Increasing the diameter of the circular inlet opening beyond a certain size can decrease air flow (rather than increase it as intended) due to air being expelled upward from the rotating impeller blades and thereby forcing some air out of the inlet opening rather than drawing air in. Prior art methods have designed variously shaped inlet openings for centrifugal fans to change the fan's air flow. Such ad hoc methods can change the air flow but not necessarily maximize the flow rate through the fan in its intended application. None of the prior art methods known to the applicants have systematically designed the inlet opening according to calculated pressure contour profiles on the fan housing's surface operating in situ.

Thus there exists a need for an improved method to form an inlet opening in a cooling fan to maximize flow rate and resultant cooling.

SUMMARY OF THE DESCRIBED EMBODIMENTS

This paper describes various embodiments that relate to an apparatus, method, and computer readable medium for optimizing an air flow for a fan assembly.

In one embodiment, a method for determining an optimal shape of a housing of a fan assembly with regards to efficient transport of air from by the fan assembly. The method is carried out by performing at least the following operations: providing the fan assembly comprising: a fan assembly housing and a cover combination, determining if the performance of the fan assembly is acceptable, and altering the shape of the fan assembly housing and cover combination if the performance of the fan assembly is not acceptable.

In one aspect of the described embodiment, the shape of the fan assembly housing can be altered by smoothing sharp edges at either or both a top portion of the housing and a bottom portion of the housing in proximity to an inlet of the fan assembly.

A fan assembly arranged to efficiently transport a coolant is described. The fan assembly includes at least a fan assembly housing. The fan assembly housing includes a fan assembly housing sidewall perpendicular to the bottom portion of the fan assembly housing and enclosing the fan assembly forming an outlet along one side, and a top portion having an inlet opening. The fan assembly also includes a cover integrally formed with the housing and an impeller mounted on a bottom portion of the fan assembly housing, wherein a portion of the fan assembly housing has a contoured shape to provide a streamlined path between an exterior of the fan assembly housing and the impeller, wherein a fan assembly housing and cover combination is contoured in accordance with an acceptable fan assembly performance criteria.

An apparatus for determining an optimal shape of a housing of a fan assembly with regards to efficient transport of air from by the fan assembly, the apparatus comprising at least means for providing the fan assembly comprising: a fan assembly housing and a cover combination, means for determining if the performance of the fan assembly is acceptable, and means for altering the shape of the fan assembly housing and cover combination if the performance of the fan assembly is not acceptable.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF EXAMPLE EMBODIMENTS

The presently described embodiments relate generally to cooling devices. More particularly, a method for forming an air inlet for a cooling fan to improve air flow through the cooling fan is described.

In the following description, numerous specific details are set forth to provide a thorough understanding of the presently described embodiments. It will be apparent, however, to one skilled in the art that the presently described embodiments may be practiced without some or all of these specific details. In other instances, well known process steps have not been described in detail in order to avoid unnecessarily obscuring the presently described embodiments.

Increasingly, portable electronic devices can use more powerful processing and storage components while simultaneously continuing to shrink in overall size. Personal notebook computers, in particular, can have small vertical height dimensions in which embedded components can be fitted. Cooling devices, including fans and mechanical heat spreaders, can be used to dissipate heat accumulated at and near powerful, heat generating processing and storage components. Significant air flow through fans enclosed in notebook computers can adequately cool internal components. Optimizing the air flow rate through fans in situ can prove challenging, as increasing an embedded fan's impeller blade height or diameter can be prohibited by space restrictions imposed by structures around the fan, such as a narrow height notebook computer base.

The size and shape of an inlet opening in a fan assembly's housing through which air can be drawn by a fan assembly's impeller can significantly affect the air flow rate of the fan assembly. Typically, prior art fans can use circular inlet openings positioned concentric to the rotational axis of the fan's impeller. The circular inlet opening shape can result in sub-optimal airflow through the fan. This sub-optimality can be due to the asymmetric shape of the fan assembly's housing and to the different air velocities generated in the fan assembly as the air circulates from the inlet opening to the outlet opening. A fixed, generic circular shaped inlet opening can also not account for a position of the outlet opening at the edge of the fan assembly nor consider the shape of an enclosure surrounding the fan assembly in which the fan assembly can operate. As such, a sub-optimal fan assembly using a generic circular opening can produce less air flow than a fan assembly with openings based on simulations of air flow in a typical operational environment.

Simulations of a representative fan assembly, which includes an impeller and fan housing, in a surrounding enclosure show that isobaric pressure contours of an air pressure profile on the surface of the fan housing can be non-circular around a circular inlet opening. By changing the shape of the fan housing's inlet opening to account for calculated negative pressure contours, particularly in an area nearer to the fan housing's inlet opening, the fan assembly can provide greater air flow. The simulation can be repeated iteratively by using a fan housing inlet opening determined based on a previous calculation as a starting point to calculate a new air pressure profile in a subsequent calculation. For example, an initial fan housing inlet opening can have a rectangular shape having sharp corners. An air pressure profile can be calculated on the surface of the fan housing using the rectangular inlet opening. The air pressure profile can be used to adjust the fan housing's inlet opening. The simulation can be repeated using the adjusted fan housing's inlet opening. For example, reducing or even eliminating a sharp corner at the fan inlet opening can help improve overall fan efficiency.

More specifically, an absence of sharp corner transitions in the fan inlet opening shape can reduce air flow disturbances that can disrupt the smooth air intake through the fan housing's inlet opening and cause turbulence. The shape of a housing sidewall of the fan assembly and the distance between the impeller blade ends and an interior surface of the housing sidewall can also influence the fan assembly's air circulation. In some embodiments the distance between the fan's impeller blades and the interior surface of the housing side wall can increase steadily as the air flow accelerates inside the fan housing before exiting the fan housing's outlet opening.

Centrifugal fans can provide greater airflow than axial fans when placed in a limited height enclosure. The narrow vertical dimensions of a notebook computer base, in which several heat sensitive components can be mounted horizontally along the computer base, can limit the effectiveness of axial fans mounted horizontally to blow air perpendicular to the computer base. While an axial fan can be mounted directly on a heat sensitive component, such as a central processing unit (CPU), the notebook computer base can often not include an opening through which to expel heated air. In addition, the narrow height of the base can restrict the use of an axial fan mounted vertically because the resulting fan size can be insufficient to create desired air flow. Instead, centrifugal fans can preferably be used to move air parallel to the notebook computer base across one or more components and heat spreader devices mounted therein.

As technology develops and allows for the miniaturization of many computer components the overall form factor for many portable computers continues to get smaller. Since computing device screens take up a fixed amount of area in most portable computing devices, one way to reduce the size of the device is by reducing its thickness. Unfortunately, some components require more vertical space than others do. In some cases, components such as the CPU and GPU require a heat sink that adds vertical height to the component. By placing some of these larger components towards the center of the device the outer edges can be gradually tapered helping to create a sleek looking device taking up less volume than a device with similar depth. In many cases the most ideal location for a cooling fan is near the outside edge of a computer enclosure; the very same edge that could benefit from the aforementioned tapering effect While this location makes it easier for the fan to expel hot air from the computer enclosure, it can also have an adverse effect on airflow. This is because air must travel over the top of a centrifugal fan to arrive at the cooling fan inlet, and the rectangular shape of the conventional cooling fan enclosure tends to constrict the airflow when placed too close to a tapered or spline shaped computer enclosure edge. Frequently this type of placement is a necessary part of the design and the rectangular angles of conventional fans then tend to slow air down and disrupt it as it travels over the top of the centrifugal fan enclosure, thereby reducing the efficiency of the cooling system.

Figure 1A:
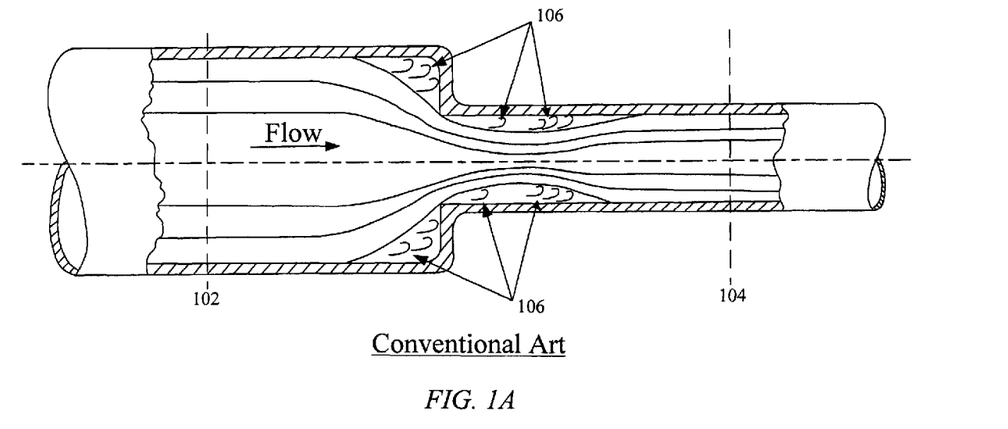
FIGS. 1A and 1B illustrate general principles relating to constriction of fluid flow.
Figure 1B:
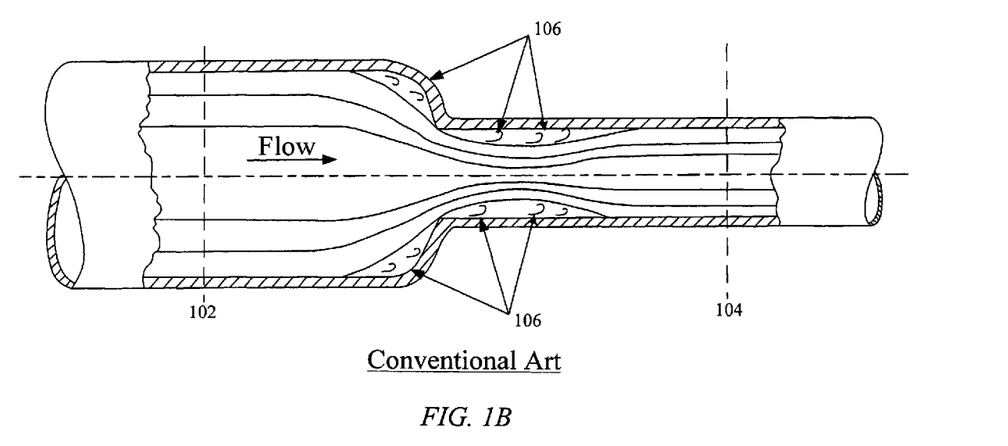

FIGS. 1A and 1B illustrate some general problems associated with restrictions on fluid flowing caused by an abruptly narrowing pipe. Bernoulli's principle states that if there is no loss of energy due to friction or turbulent flow then the product of the pressure and velocity of a fluid flowing through a pipe of variable width will remain constant. Stated as a formula:

$$P_1 v_1 = P_2 v_2 \qquad \text{Eq. (1)}$$

For example, given a pressure $P_1$ of 100 kPa at position 102 and fluid velocity $v_1$ of 1 m/s, then if pressure $P_2$ drops to 50 kPa at position 104 the fluid velocity must increase to 2 m/s. Unfortunately, since fluid flow naturally moves from high pressure areas to low pressure areas the low pressure area that Bernoulli's principle predicts must be overcome to allow the air to continue to flow along its path. This is accomplished by putting additional energy into driving the flow. In some situations this might be done by a pump, in others situations a fan might be employed. Nevertheless, additional energy must be introduced to overcome the resulting low pressure area. In addition to the low pressure area forecast by Bernoulli, real world fluid flow suffers from the effects of turbulence and drag, which can also greatly affect the energy required to move fluids through a narrow space. In general, fluids moving at higher speeds suffer from greater energy loss due to friction between the fluid and the sidewalls of the conduit. Since according to Bernoulli the fluid has to speed up in the narrowed portion of the conduit this means an increase in friction related energy depletion would occur. This slows the fluid even more and adversely bleeds energy from the fluid flow. FIG. 1A shows a configuration that is far from ideal. The sharp corners present in this configuration result in another inefficient condition known as turbulent flow. Turbulent flow is a flow regime characterized by chaotic and stochastic property changes. Although there are limited circumstances in which turbulent flow can be beneficial this case is not one of them. Since the fluid conduit narrows suddenly pockets of turbulent flow occur, as shown by turbulent flow areas 106. Turbulent flow areas 106 actually narrow the effective opening of the conduit even farther, thereby creating even more pressure drop and requiring even more energy to be input to keep the fluid flow from slowing. A more gradual constriction of the flow area as shown in FIG. 1B can result in less turbulence, a larger effective flow area, and consequently a lower amount of resulting energy loss. Even though the fluid flow must fit through the same restricted physical area the tapering of the inlet results in significant benefits for the conservation of energy.

Figure 2A:
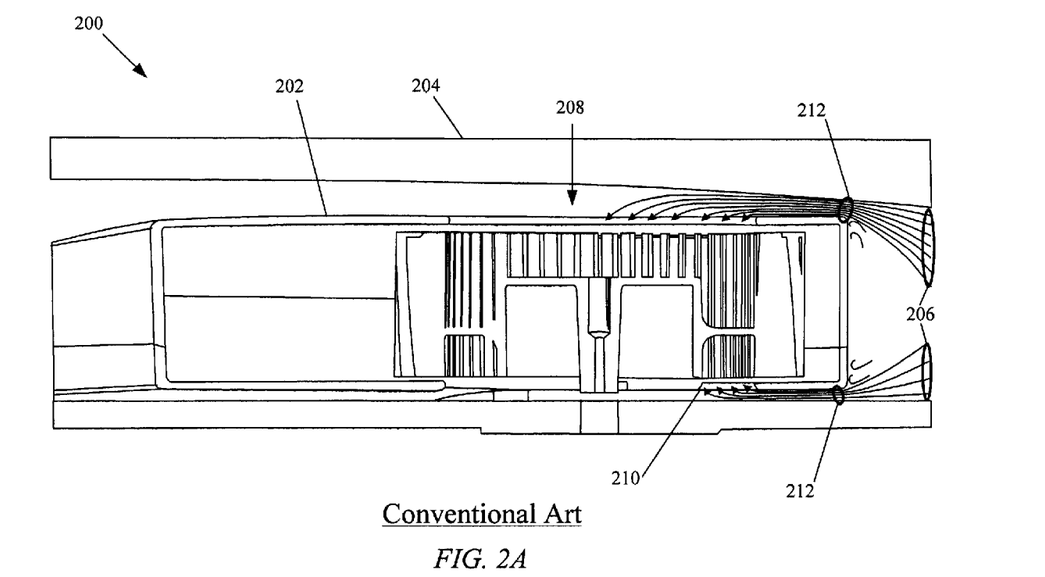
FIG. 2A shows a cross-sectional view of a conventional centrifugal cooling fan disposed near the internal surface of a portable computer enclosure.
Figure 2B:
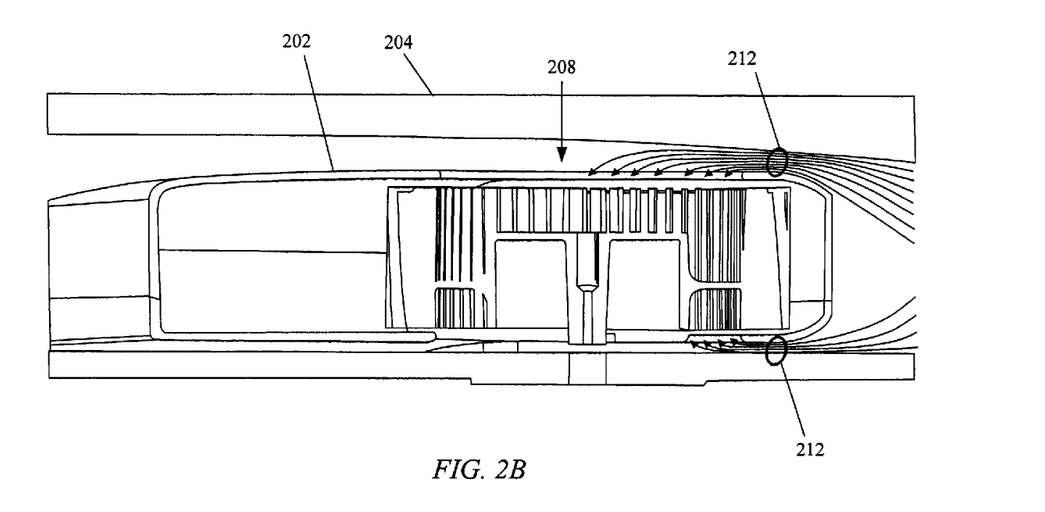
FIG. 2B shows a cross-sectional view of a centrifugal cooling fan assembly where portions of the corners have been sculpted away in accordance with the described embodiments.

One way to help airflow through a computer enclosure is to optimize the shape of the fan enclosure itself. FIG. 2A shows a conventional cooling fan 200 with a computer enclosure 202 disposed near a spline shaped edge of computer enclosure 204. In this diagram airflow 206 is shown entering from the right side of the depicted computer enclosure 204. When airflow 206 reaches cooling fan enclosure 202 airflow 206 is split between the paths to top inlet 208 and bottom inlet 210 of cooling fan enclosure 202. In this particular embodiment more air travels along the top of the cooling fan enclosure since top inlet 208 is larger than bottom inlet 210. It should be briefly noted that cooling fans with only one inlet are also within the consideration of the described embodiments. Cooling fan enclosure 202 has sharp corners that create pinch points 212. Pinch points 212 make this configuration quite similar to the configuration shown in FIG. 1A. Since the flow is compressed abruptly from a wide conduit to two very small ones the effect is quite similar. Turbulence can be expected just prior to airflow 206 entering pinch points 212 and just after, although in this diagram the turbulent flow has been omitted in some places since the conduit is so small. The turbulence that occurs just after entry into pinch points 212 restricts the flow even more, thereby increasing the severity of the resulting pressure drop. This causes a number of undesirable outcomes. First, the extra power being used by cooling fan 200 causes additional electrical loading on the system. This is especially problematic in a system that relies on a battery for power. Second, when the fan has to work harder this degrades the acoustic performance of the computing device, since a harder working fan invariably produces more noise. Finally, this condition reduces the overall cooling capability of the computing system. When cooling fan 200 is operating at its maximum speed it cannot drive as much air through the system as it could if it did not have to overcome the large pressure drop being created by pinch points 212. Fortunately, a sizeable number of cooling fans have extra room between the fan blades and the inside surface of cooling fan enclosure 202. FIG. 2B shows how this extra room can be exploited to optimize the shape of the fan enclosures without significantly affecting fan performance.

FIG. 2B shows a cooling fan disposed in a position quite similar to the cooling fan shown in FIG. 2A. The cooling fan from FIG. 2B has a fan enclosure with sculpted corners which can significantly reduce the abruptness of pinch points 206. By rounding off the corners of cooling fan enclosure 202 the flow of air can be constricted much more gradually, and a more gradual pressure drop can be achieved. A more gradual pressure drop allows turbulent flow to be reduced and the effective area of pinch points 212 to be increased resulting in a smaller pressure drop. The larger effective pinch points 212 also make for lower air velocities, resulting in less loss due to friction between airflow 206 and the surfaces it travels along. These two benefits help to realize a number of benefits, which include less strain on the cooling fan itself and a cooling system with more capacity for heat removal. Cooling fan enclosures for computers are typically made of plastic. In some cases, the design of the cooling fan enclosure can be accomplished without substantially affecting the performance of the fan. In this case an existing supplier of cooling fans can be instructed to create a new mold for the fan enclosure conforming to an optimized shape. Since the fan impeller does not require modification this method is significantly more cost effective than designing a custom fan from scratch. In this way validated fan designs can be subtly modified to conform to the unique requirements created by each different computer enclosure design.

Figure 2C:
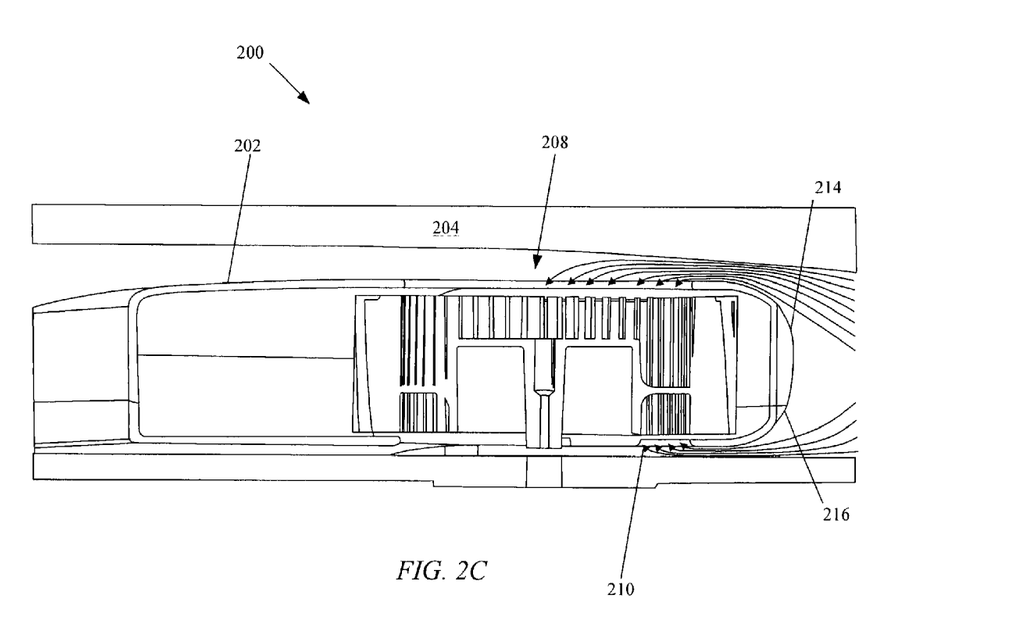
FIG. 2C shows a cross-sectional view of a centrifugal cooling fan assembly where material has been added to the outside surface of the cooling fan housing to help reduce turbulence in accordance with the described embodiments.

In FIG. 2C a second embodiment is shown in which in addition to sculpting away material, material can also be added on to the design. Portions 214 and 216 (most likely the same material cooling fan enclosure 202 is constructed from) can be added on to the cooling fan enclosure (along the lines of a cowling). By making these additions airflow 206 can be more gradually channelized towards the fan inlets, resulting in a lower incidence of turbulence around external sidewall of cooling fan enclosure 202. Although adding to the outside of the fan enclosure does create a slightly larger footprint it has the advantage of giving designers more flexibility in the exterior contouring of the cooling fan enclosure. While the illustration shows the contouring as symmetric the shape could also be shifted up or down in order to influence how much air is directed towards each fan inlet.

Figure 3A:
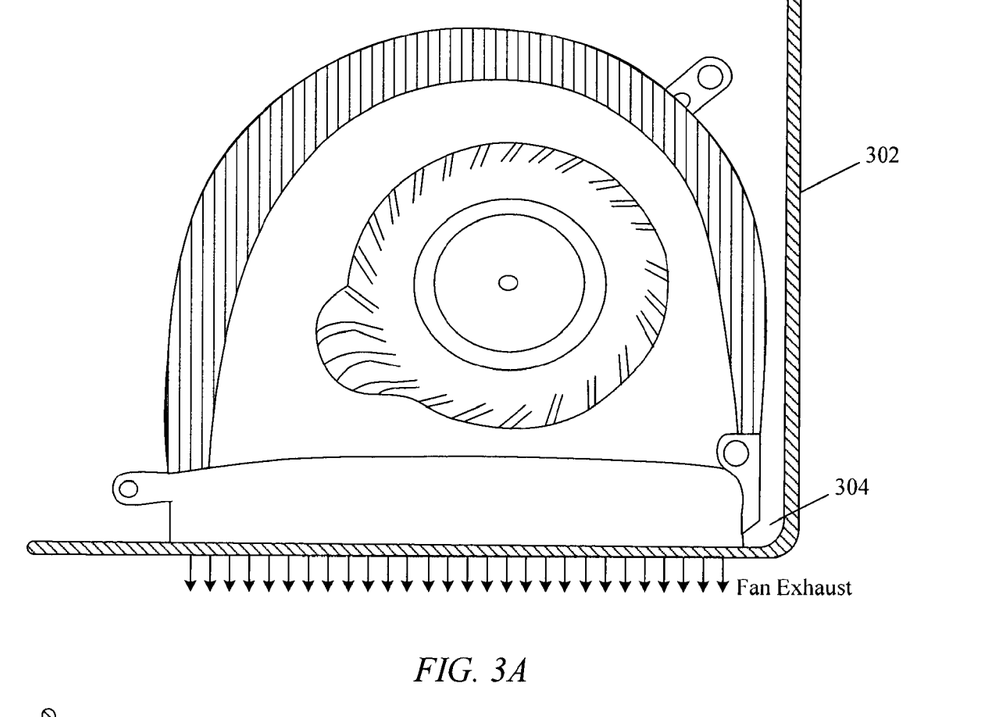
FIGS. 3A and 3B show top views of two centrifugal fans in accordance with the described embodiments
Figure 3B:
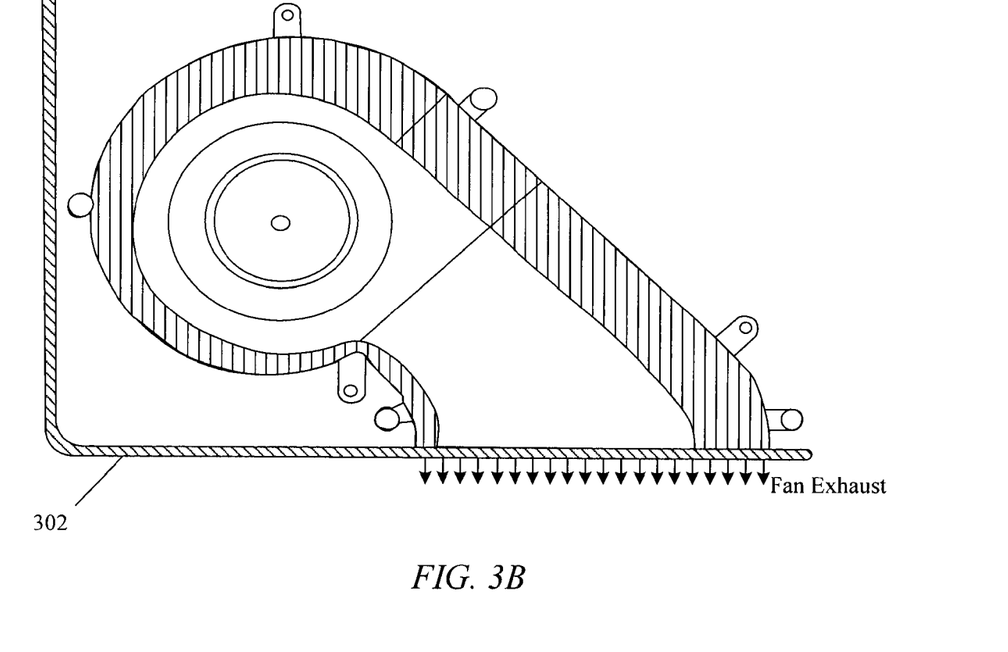

FIGS. 3A and 3B show top views of sculpted centrifugal cooling fans disposed inside computer enclosures. In both of these particular embodiments the entire perimeter of the fan is sculpted. The sculpted portions are indicated by the line-shaded regions of the fan. FIG. 3A shows an embodiment in which the fan is placed near the vent outlet. The sculpting can be especially valuable in this case if it is placed near a tapered or spline shaped corner. The tapering helps to prevent hot pockets of air from being trapped in corner 304, unable to overcome the pressure drop created by a hard fan enclosure edge. Even when the fan edges are not pushed up against a corner or a side, the gradually sloping enclosure makes the airflow less constricted, lowering any pressure drops and making the air circulation easier for the cooling fan motor, thereby saving valuable electrical power. In FIG. 3B the cooling fan is located farther from the cooling vent, and benefit can be gained from sculpting both the fan itself and the extended vent portion. The sculpted vent portion is useful because in some situations air could flow up over the vent on its way to the air inlet. While both of these embodiments include sculpting along all the sides, a design that only includes sculpting of one or two portions of the enclosure is certainly within the contemplation of the described embodiments. In yet another example, it might be beneficial to leave a small portion rectangular to assist in creating a flat surface for attaching a mounting bracket.

Figure 4:
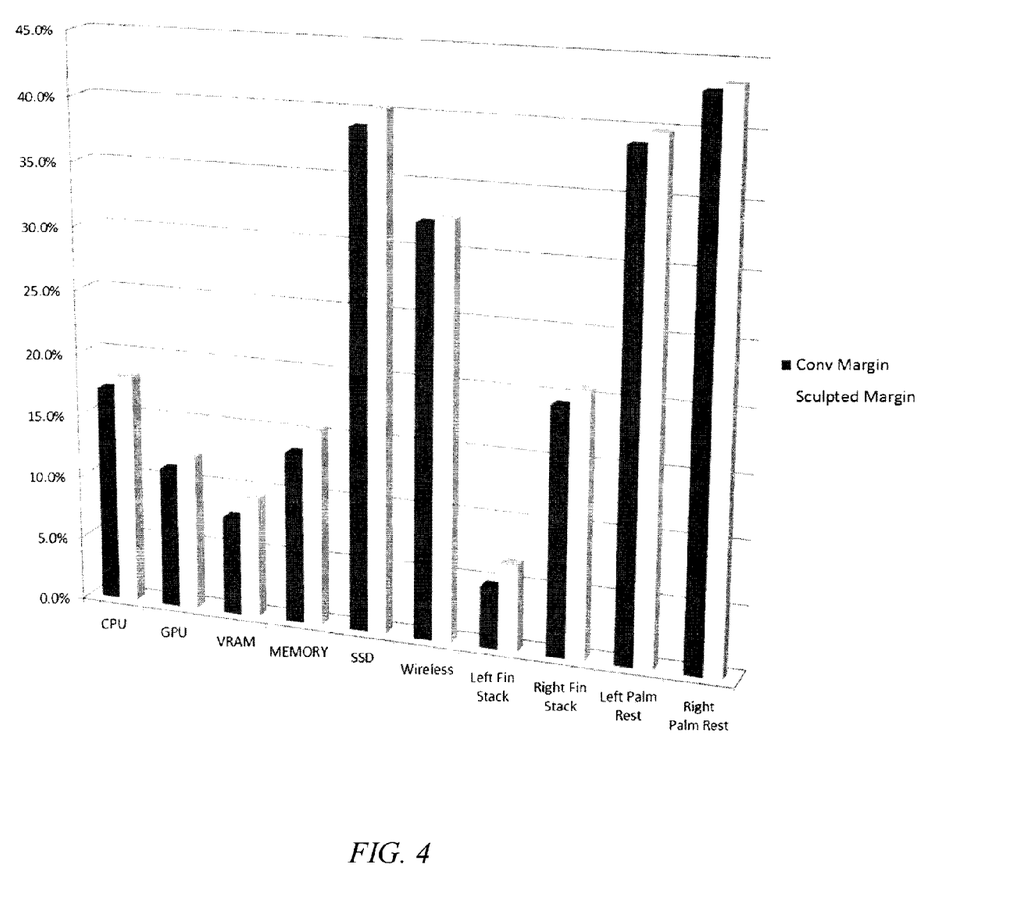
FIG. 4 shows a performance comparison between a conventional fan and a sculpted enclosure fan.

FIG. 4 shows relative performance for a comparison test between sculpted and unsculpted cooling fan configurations. The unsculpted or conventional fan configuration results are shown by the dark shaded bars, while the sculpted results are shown by the lighter bars. The bars represent the margin the computer system enjoys below the maximum temperature limits of each individual computer component. In this particular test the sculpted fan configuration consistently outperformed the conventional fan, even though it ran with a higher heat load. The computer with the sculpted heat fans was able to run at 81.4 W as opposed to the 78.4 W of loading maintained by the conventional cooling fans. This allowed almost a 3.5% power advantage to the system with the sculpted cooling fans along with lower overall operating temperatures. This results in a computer that is less likely to have to throttle back its performance during intense computing periods. It should be noted that in this particular example the limiting factor is the heat of the left cooling fin stack that only enjoys a margin of about 5% under the maximum allowable temperature for the system. This clearly illustrates the potential benefits available by optimizing the cooling design packages. In this particular design both the GPU and CPU operate well below the maximum since other components in the enclosure suffer from large temperature gradients. This particular described embodiment is just one way in which to help increase the efficiency of the cooling system.

Figure 5:
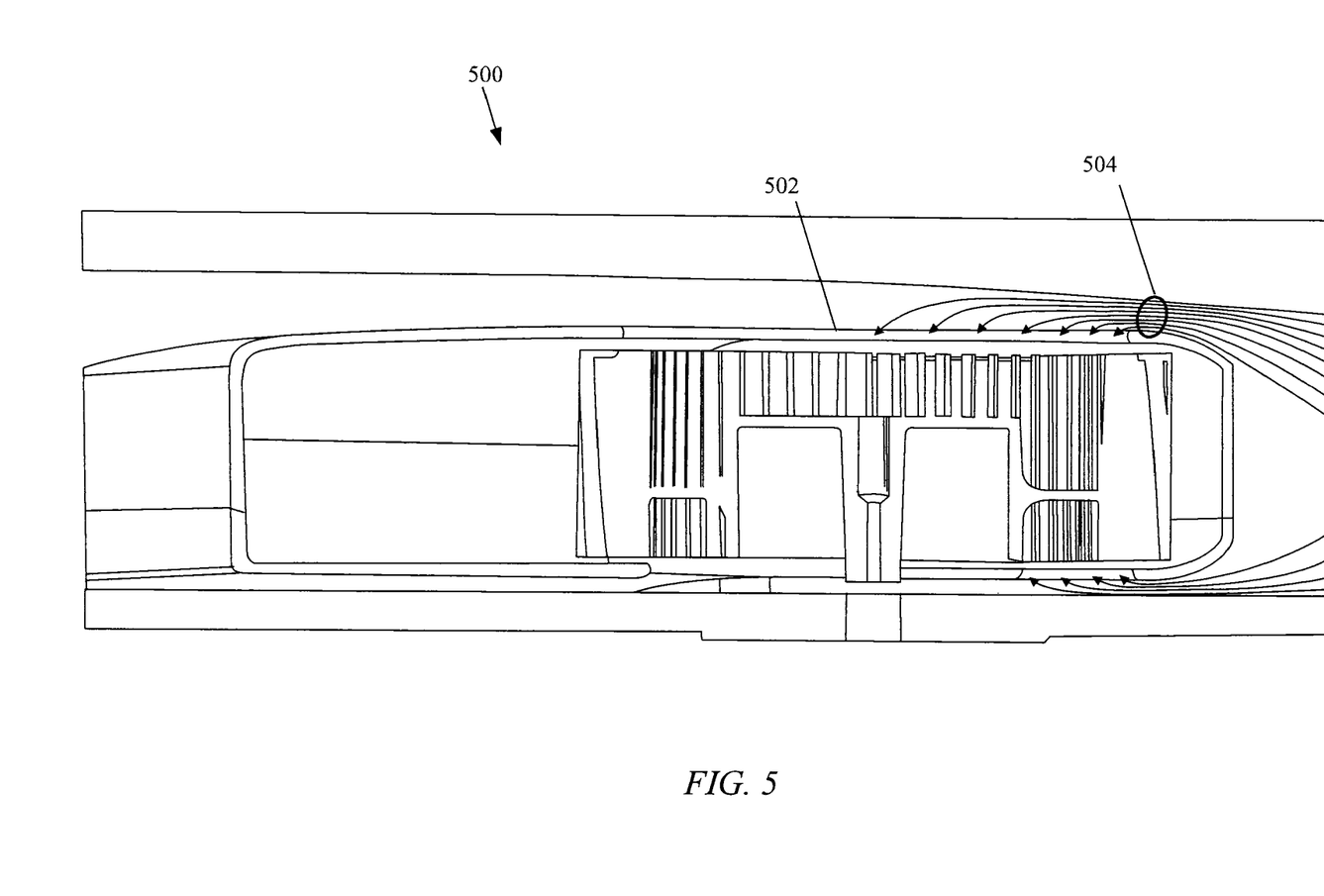
FIG. 5 shows a centrifugal cooling fan with both a sculpted fan enclosure and a modified inlet shape in accordance with the described embodiments

FIG. 5 shows a third embodiment in the form of fan assembly 500 where in addition to sculpting the corners of the fan enclosure the size of the air inlet is modified. By modifying the shape of air inlet 502 the length of the constricted air passage can be reduced and in some cases this can also reduce the severity of pinch point 504. By minimizing the amount of time the air must speed up and lower its pressure, drag can be reduced, and by widening pinch point 504 the overall pressure drop may be reduced thereby reducing the loading on the fan and increasing overall system efficiency. Care must be taken in modifying the fan inlet shape as this may have a greater effect on fan performance than simply rounding off the corners of the fan enclosure. In situations where inefficiencies caused by the change in shape of inlet 502 are less than efficiencies gained by the reduction in airflow constriction this type of redesign can result in a more efficient system. While inlet redesign can be unpredictable, this type of redesign shares an important advantage with the embodiment described under FIG. 2. Namely, a manufacturer can simply place a newly shaped cooling fan enclosure over an existing fan design, consequently easing the implementation of the design variation and helping to keep the cost of change low.

Figure 6:
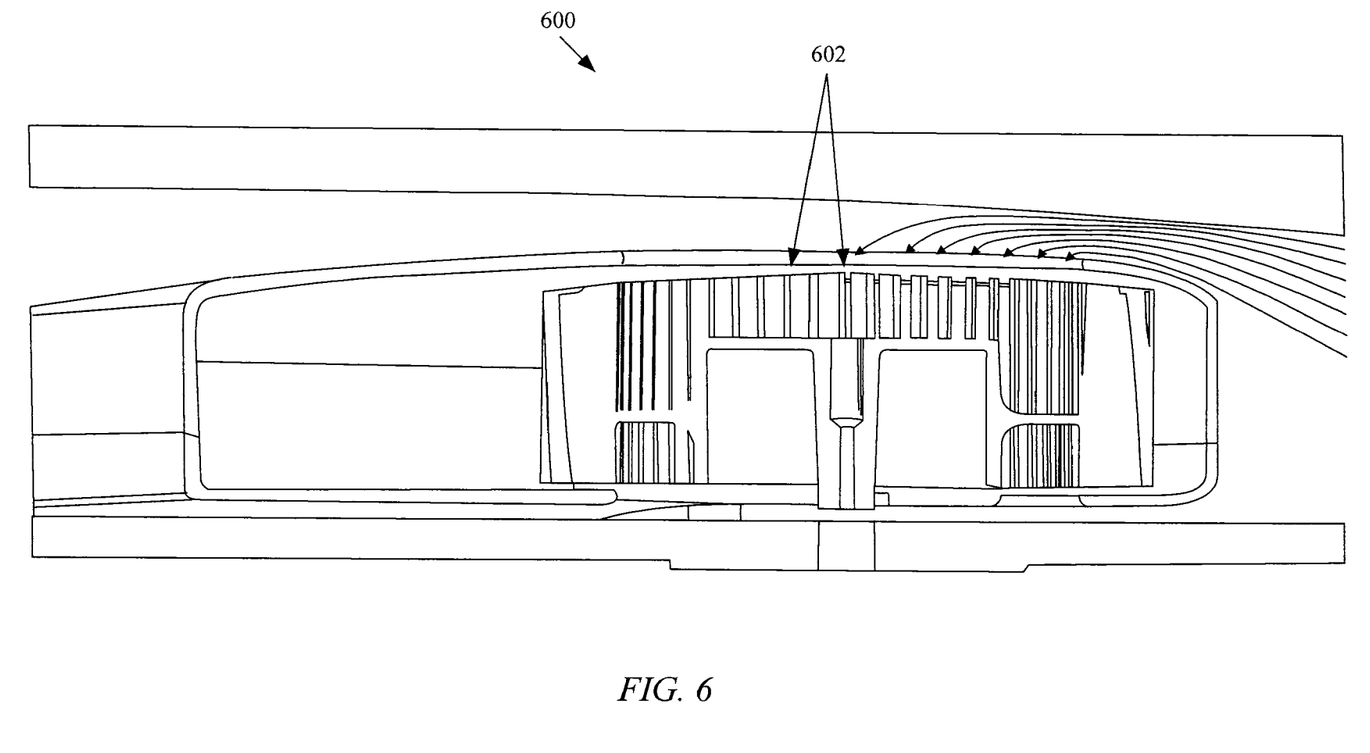
FIG. 6 shows a centrifugal cooling fan with both a sculpted fan enclosure and sculpted fan blades.

FIG. 6 shows a fourth embodiment in the form of fan assembly 600 for sculpting the cooling fan enclosures 602. In configurations where high performance is essential it may be worthwhile to conduct a redesign on the fan blades themselves. By reshaping fan blades 602, the shape of the fan enclosure can be reduced all the way up to the air inlet itself, thereby creating the lowest resistance path for air to flow into the fan inlet. In this way, the fan blade redesign may allow for the improved airflow configuration for a particular computer system. More experimentation may be required for each cooling fan as reduction of the blade height can reduce the overall power of the fan itself. Nevertheless, since more powerful machines command a higher price premium this can make up for any incidental increases in the cost of design.

Figure 7:
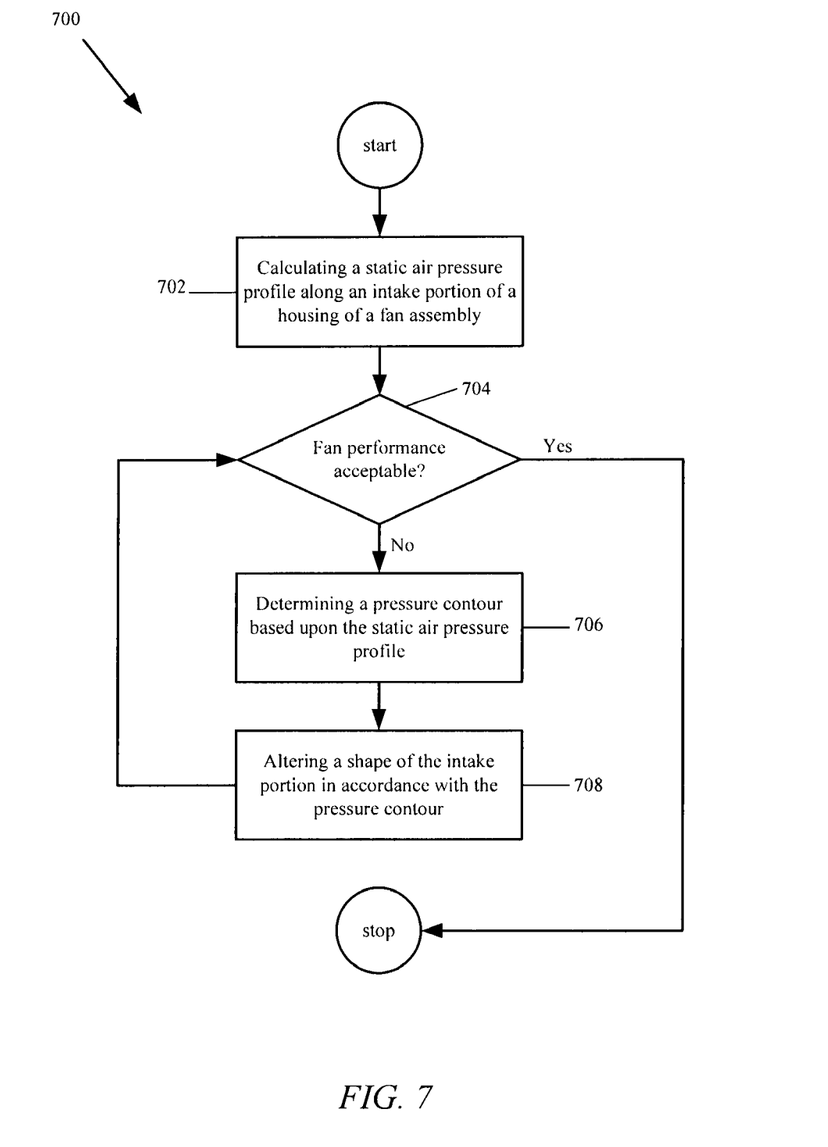
FIG. 7 shows a flow chart describing a process for optimizing a shape of a fan inlet assembly in accordance with the described embodiments.

FIG. 7 shows a flow chart describing a process 700 for optimizing a shape of a fan inlet assembly in accordance with the described embodiments. Process 700 can be carried out by software embodied in non-transitory computer readable medium executed by a design computing system. In any case, process 700 can be performed by carrying out at least the following operations. At 702, calculating an air pressure profile along an intake portion of a housing of a fan assembly. The air pressure profile can indicate areas of turbulent air flow associated with sharp edges or other fan housing geometry. Once the air pressure profile is calculated, the performance of the fan assembly is determined. The determination of the fan performance can take into account many factors. Such factors can include the efficiency (i.e., the amount of energy required to move a unit volume of air) of the fan assembly, the static pressure developed at the fan inlet and outlet, and so forth. In any case, if the performance of the fan assembly is acceptable, then process 700 ends, otherwise, at 706 a pressure contour is determined based upon the pressure profile. The pressure contour can help identify particular geometries (such as choke points) that are associated with fan assembly inefficiency. For example, a sharp corner at the fan inlet can restrict the passage of air at the inlet as well as enable the formation of turbulent air flow. Therefore, by identifying the offending geometries, the configuration of the fan assembly can be modified at 708. Control is then passed back to 704 for a further evaluation of the fan assembly performance.

Figure 8:
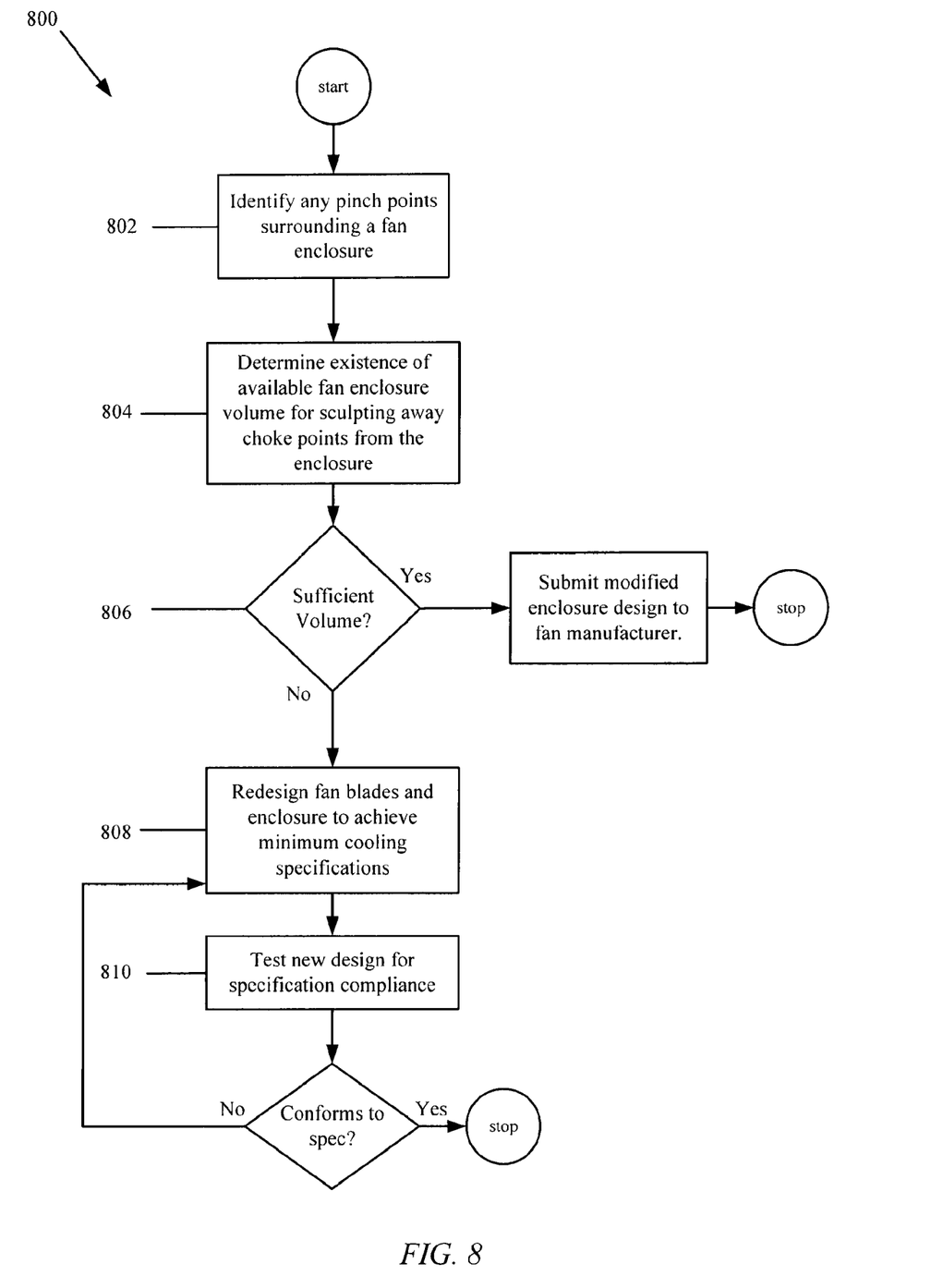
FIG. 8 shows a flow chart describing a process for optimizing a shape of a fan inlet assembly including a fan inlet shape and blade shape in accordance with the described embodiments.

FIG. 8 shows a flow chart detailing process 800 in which decisions about changes to a cooling fan enclosure are made. In the first step 802 pinch points on at least one computer system cooling fan are identified and the severity of each pinch point is assessed. In step 804 the enclosures of cooling fans with problematic pinch points are assessed to determine what portions of the cooling fan enclosures can be sculpted away. In step 806 analyses is done to determine whether sculpting the identified portions of the cooling fan enclosures away is sufficient to provide cooling advantages to the computer system. This step can be accomplished through a variety of virtual and physical testing processes. This step can also include variations in the inlet design, where the variations do not change the cooling fan performance enough to require a fan blade redesign. Once the efficiencies to be gained by sculpting are determined a decision can be made. If changes to the cooling fan enclosure itself are enough to meet the computer system's cooling performance requirements then specifications for a new enclosure are sent to the fan component manufacturer and the process ends. If the efficiencies gained by sculpting are not sufficient enough for the computer system design then step 808 commences. In step 808 fan blade sculpting allows much more significant changes to be made to the cooling fan enclosure. Where there is perhaps not enough room to make significant changes by adding on to the fan enclosure, modest changes in the fan blades may be required to ease the flow of air over the surface of the cooling fan enclosure. Once the fan blades are redesigned to meet the cooling specifications, step 810 commences with testing in the computer system. If the design specifications are met and cooling goals are achieved the process is finished; however if the goals are not met then step 708 is revisited and redesign is performed iteratively until the design goals are met.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data that can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for customizing a shape of a fan assembly housed within an enclosure, the method comprising:
    characterizing an efficiency of an air transport through an air inlet opening of a fan assembly positioned within the enclosure, the fan assembly comprising a combination of a fan assembly housing and a cover, and a plurality of blades coupled to an impeller, wherein the combination of the fan assembly housing and the cover includes a wall proximate the air inlet;
    modifying the shape of the fan assembly in accordance with the characterization by enlarging a pinch point area between the wall and the enclosure, wherein modifying the shape includes contouring the wall proximate the air inlet opening so as to increase the efficiency of the air transport through the air inlet; and
    reducing a height of at least one of the plurality of blades to conform to the contoured shape of the combination of the fan assembly housing and cover.

2. The method as recited in claim 1, wherein the impeller is mounted on a bottom portion of the fan assembly housing, wherein the combination of fan assembly housing and cover comprises:
    a fan assembly housing sidewall perpendicular to the bottom portion of the fan assembly housing and enclosing the fan assembly forming an outlet along one side; and
    a top portion having the air inlet opening.

3. The method as recited in claim 2, wherein the pinch point area is enlarged by altering the top portion of the fan assembly housing and cover combination.

4. The method as recited in claim 3, wherein the pinch point area is further enlarged by altering the bottom portion of the fan assembly housing and cover combination.

5. The method as recited in claim 2, wherein the pinch point area is enlarged by altering the bottom portion of the fan assembly housing and cover combination.

6. The method as recited in claim 1, wherein the fan assembly is incorporated into a portable computing system.

7. The method as recited in claim 1, wherein the fan assembly is a centrifugal fan.

8. A fan assembly arranged to efficiently transport a coolant within an enclosure, the fan assembly comprising:
    a fan assembly housing, comprising:
        a fan assembly housing sidewall perpendicular to a bottom portion of the fan assembly housing and enclosing the fan assembly forming an outlet along one side, and
        a top portion;
    a cover integrally formed with the housing;
    an inlet opening on at least the top portion or the bottom portion;
    an impeller mounted on the bottom portion of the fan assembly housing; and
    a plurality of blades coupled to the impeller,
        wherein the fan assembly housing has a contoured shape from the sidewall to the inlet opening to enlarge a pinch point that reduces an efficiency of an air transport through the air inlet opening and to provide a streamlined path between an exterior of the fan assembly housing and the impeller, and a height of at least one of the plurality of blades conforms to the fan assembly housing contoured shape.

9. The fan assembly as recited in claim 8, wherein the shape of the fan assembly housing and cover combination is contoured in accordance with an acceptable fan assembly performance criteria by determining an airflow output value, and comparing results of the determining to a pre-determined performance value.

10. The fan assembly as recited in claim 9, wherein the shape of the fan assembly housing and cover combination is contoured on the top portion in accordance with the acceptable fan assembly performance criteria.

11. The fan assembly as recited in claim 10, wherein the shape of the fan assembly housing and cover combination is further contoured on the bottom portion in accordance with the acceptable fan assembly performance criteria.

12. The fan assembly as recited in claim 9, wherein the shape of the fan assembly housing and cover combination is contoured on the bottom portion in accordance with the acceptable fan assembly performance criteria.

13. The fan assembly as recited in claim 8, wherein the fan assembly is a centrifugal fan.

14. An apparatus for customizing a shape of a fan assembly housed within an enclosure, the apparatus comprising:
    means for characterizing an efficiency of an air transport through an air inlet opening of a fan assembly positioned within the enclosure, the fan assembly comprising a combination a fan assembly housing and a cover, and a plurality of blades coupled to an impeller, wherein the combination of the fan assembly housing and the cover includes a wall proximate the air inlet;
    means for modifying the shape of the fan assembly in accordance with the characterization by enlarging a pinch point area between the wall and the enclosure, wherein modifying the shape includes contouring the wall proximate the air inlet so as to increase the efficiency of the air transport through the air inlet; and means for reducing a height of at least one of the plurality of blades to conform to the contoured shape of the combination of the fan assembly housing and cover.

15. The apparatus as recited in claim 14, wherein the impeller is mounted on a bottom portion of the fan assembly housing, wherein the combination of fan assembly housing and cover comprises:
a fan assembly housing sidewall perpendicular to the bottom portion of the fan assembly housing and enclosing the fan assembly forming an outlet along one side; and
a top portion having the air inlet opening.

16. The apparatus as recited in claim 15, wherein the pinch point area is enlarged by altering the top portion of the fan assembly housing and cover combination.

17. The apparatus as recited in claim 16, wherein the pinch point area is further enlarged by altering the bottom portion of the fan assembly housing and cover combination.

18. The apparatus as recited in claim 15, wherein the pinch point area is enlarged by altering the bottom portion of the fan assembly housing and cover combination.

19. The apparatus as recited in claim 14, wherein the fan assembly is incorporated into a portable computing system.

20. The apparatus as recited in claim 14, wherein the fan assembly is a centrifugal fan.

* * * * *